Dec. 26, 1933.   W. H. STAPLES   1,940,979
MECHANISM FOR LOCKING VEHICLES
Filed April 11, 1929   2 Sheets-Sheet 1
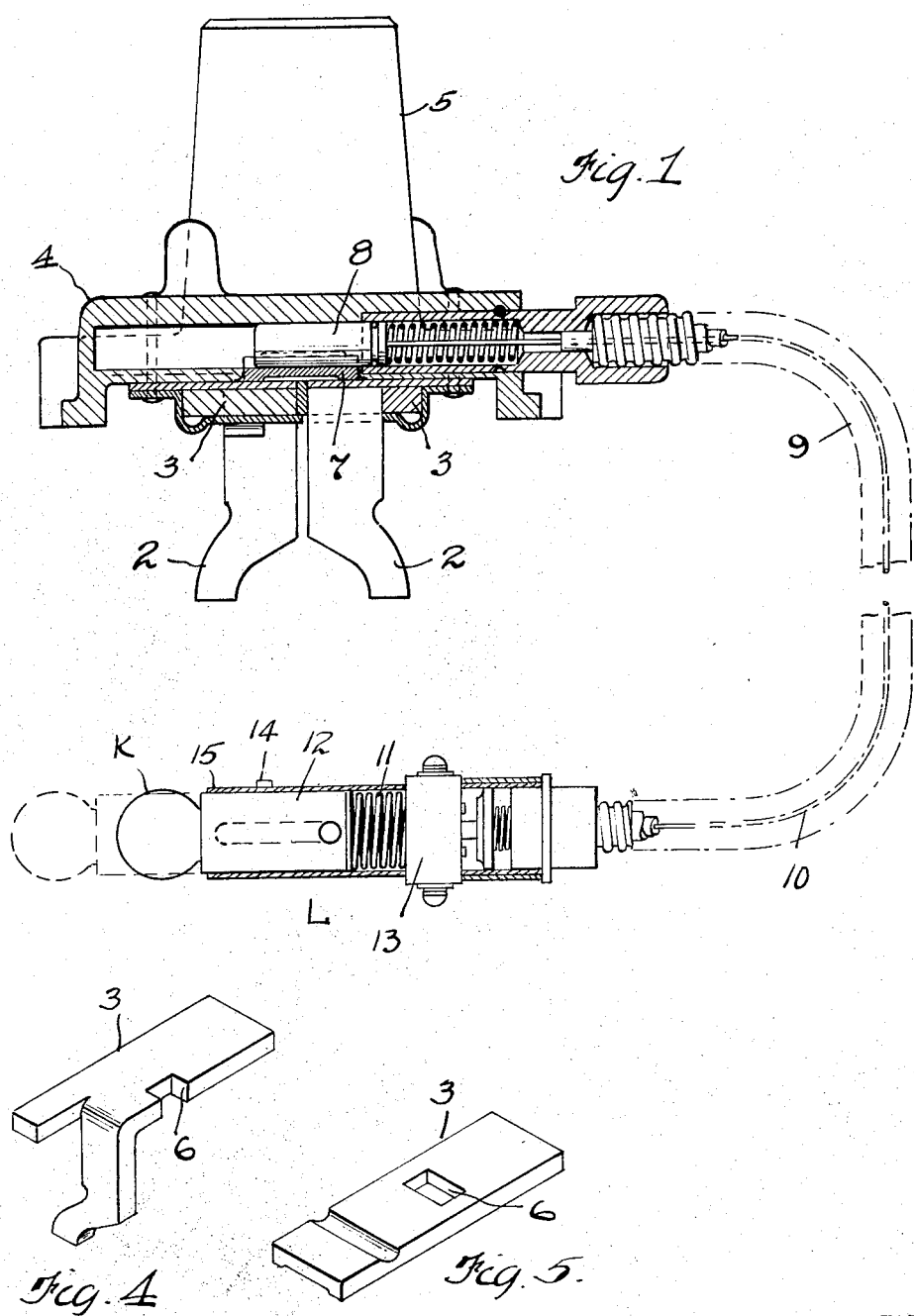
INVENTOR.
William H. Staples
BY
Fay, Oberlin & Fay
ATTORNEYS.

Dec. 26, 1933.  W. H. STAPLES  1,940,979
MECHANISM FOR LOCKING VEHICLES
Filed April 11, 1929  2 Sheets-Sheet 2
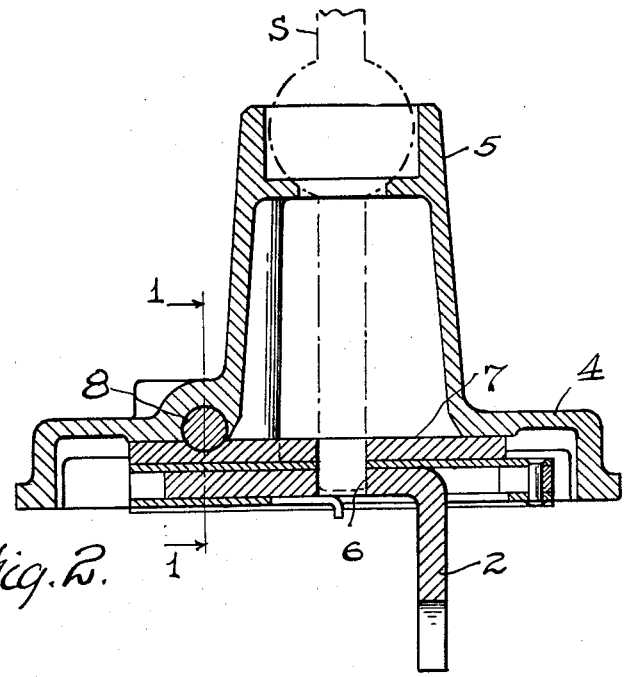
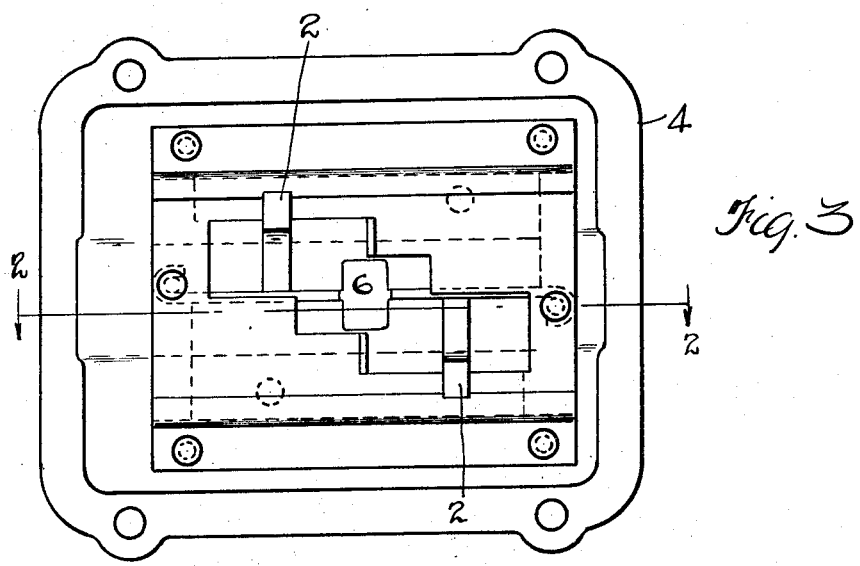
INVENTOR.
William H. Staples
BY
Fay, Oberlin & Fay
ATTORNEYS.

Patented Dec. 26, 1933

1,940,979

UNITED STATES PATENT OFFICE 1,940,979

MECHANISM FOR LOCKING VEHICLES

William H. Staples, Cleveland, Ohio, assignor to The Blossom Lock Company, Cleveland, Ohio, a corporation of Ohio Application April 11, 1929. Serial No. 354,272

2 Claims. (Cl. 70—126)

This invention relates to locking mechanism, and more particularly mechanism for locking power-propelled vehicles; and it is among the objects of the invention to provide equipment of a simple character which is at the same time effective, and also practicable in manufacture. Other objects and advantages will appear as the description proceeds.

To the accomplishment of the foregoing and related ends, the invention, then, consists of the features hereinafter fully described, and particularly pointed out in the claims, the following description and the annexed drawings setting forth in detail certain structure embodying the invention, such being illustrative however of but one of the various ways in which the principle of the invention may be employed.

In said annexed drawings:—

Fig. 1 is a view partly in section and partly in elevation showing mechanism embodying the present invention; Fig. 2 is a sectional detail; Fig. 3 is a bottom plan view of the structure shown in Fig. 2; and Figs. 4 and 5 are isometric view of details.

Referring more particularly to the drawings, Fig. 1 shows in arrangement somewhat conventionalized on account of space limitations, a manually-operated lock-head L, which is mounted at a convenient point accessible to the operator of the vehicle, in most vehicles of common type this being usually at the dash. Controlled from such lock-head, by suitable connecting means is the further mechanism which engages with operative parts of the vehicle drive, for instance the transmission; this including gear shifting fingers 2 which engage in collars of pinions slidably mounted to selectively mesh with gears of respective ratio, the detail of which being quite well known and standardized requires no further patricular indication. These gear shifting fingers are associated with gear shift control mechanism, for instance being carried by shifter members which are reciprocably mounted in the housing, for instance in the form shown, these being plates 3 slidable in guideways carried by the cover or top member 4 of the housing. It will be understood that a gear shift lever operated by the driver of the vehicle, and for example of the universal type including a mounting socket 5 through which the hand lever has access for engagement in openings 6 in the shifter finger-carrying members. Engageable into a recess in the gear shift control mechanism is a locking bolt 8. In one convenient form, the bolt-receiving recess is provided by mating grooves in the housing member and an auxiliary member movable with the plates 3. In this manner the locking bolt 8 may have direct access to the elements concerned in the gear shifting, thus reducing the locking structure to a minimum of simplicity.

The connection between the lock-head L and the locking bolt 8 is preferably of a type allowing application of the thrust force from such point of remote control as most convenient, and to this end, an armored conduit 9 extends from the lock-head to the housing 4, and within the conduit a connecting member 10, for instance in the form of a suitable push-pull wire, has engagement with the lock and the bolt respectively. Most conveniently, the lock-head may be formed such as to include a self-contained means for retracting the locking bolt, on the unlocking manipulation of the key k. For this, a suitable spring 11 is arranged between the lock barrel 12 and the abutment 13, such that on turning the key k to withdraw the latch 14 from its receiving-opening in the lock casing 15, the spring 11 may force the barrel 12 outwardly and at the same time through the connecting member 10 pull the locking-bolt 8 into retracted position out of the mating grooves.

The manner of operation of the mechanism will be clear from the foregoing, it being seen that when the key k is turned by the operator to unlocking position, the spring 11 retracts the locking bolt 8 from its engagement with the shifter element, whereupon the hand lever may be thrown into position to slide the gear-shifting finger 2 to carry its pinion into required position of meshing, and so on for the further usage thereof as required. When it is desired to lock the mechanism, all that is necessary is to press the lock-barrel 12 with its key k in proper position, and the lock immediately engages, the locking bolt 8 at the same time sliding into its mating grooves to hold the shifter elements. By the incorporation of a spring 16 adjacent the bolt 8, such spring being weaker than spring 11, the bolt will be automatically locked in the event of tampering with the mechanism and a severing of the connecting wire 10.

The precise form of the shifter elements and the extent of sub-division therefore may of course be varied in accordance with the particular type of drive encountered, and the precise point at which it is desired to effect the engagement of the locking bolt in the operating mechanism.

Other modes of applying the principle of the invention may be employed, change being made as regards the details disclosed, provided the means stated in any of the following claims, or the equivalent of such, be employed.

I therefore particularly point out and distinctly claim as my invention:—

1. In a device of the class described, a transmission housing top member, a plate reciprocable under said top member and having a connection to a gear-actuating finger, a recess extending under said top member, a locking-bolt movable in said recess and into a recess in said plate, means in said transmission housing-top for normally holding said plate and gear-actuating fingers, said means including a spring in the recess under said top member uniformly pushing the bolt toward locking position, and a connection from a remote point for operating said bolt against said spring.

2. In a device of the class described, a transmission housing top member, reciprocable plates thereunder, one having a gear-engaging finger on the lower side and the other having a groove on its upper side, a recess extending under said top member, a locking bolt movable in said recess and into the groove in said plate, means in said transmission housing-top for normally holding said plates and gear-engaging fingers, said means including a spring in the recess under said top member uniformly pushing the bolt toward locking position, a connection from a remote point for operating said bolt, means at such remote point for locking said connection, and a spring in association therewith and with said connection for retracting said bolt.

WILLIAM H. STAPLES.